US012793053B2

(12) United States Patent
Molloy et al.

(10) Patent No.: US 12,793,053 B2
(45) Date of Patent: Nov. 10, 2026

(54) SIGNATURE-BASED ATOMIC SWAP

(71) Applicant: nChain Licensing AG, Zug (CH)

(72) Inventors: Katharine Molloy, London (GB); Craig Steven Wright, London (GB); Wei Zhang, London (GB)

(73) Assignee: nChain Licensing AG, Zug (CH)

( * ) Notice: Subject to any disclaimer, the term of this patent is extended or adjusted under 35 U.S.C. 154(b) by 57 days.

(21) Appl. No.: 18/720,520

(22) PCT Filed: Nov. 23, 2022

(86) PCT No.: PCT/EP2022/082968
§ 371 (c)(1),
(2) Date: Jun. 14, 2024

(87) PCT Pub. No.: WO2023/117274
PCT Pub. Date: Jun. 29, 2023

(65) Prior Publication Data

US 2025/0053965 A1 Feb. 13, 2025

(30) Foreign Application Priority Data

Dec. 21, 2021 (GB) ..................................... 2118682

(51) Int. Cl.
*G06Q 20/38* (2012.01)
*G06F 21/64* (2013.01)
(Continued)

(52) U.S. Cl.
CPC ........... *G06Q 20/3825* (2013.01); *H04L 9/50* (2022.05)

(58) Field of Classification Search
USPC ............................................................ 705/44
See application file for complete search history.

(56) References Cited

U.S. PATENT DOCUMENTS

| | | | | |
|---|---|---|---|---|
| 11,310,060 | B1 * | 4/2022 | Poelstra | H04L 9/3066 |
| 11,354,657 | B2 * | 6/2022 | Fang | G06Q 20/407 |
| 2020/0374113 | A1 * | 11/2020 | Noam | H04L 9/0637 |

FOREIGN PATENT DOCUMENTS

| | | | |
|---|---|---|---|
| CN | 113568946 | A | 10/2021 |
| GB | 2584154 | A | 11/2020 |

(Continued)

OTHER PUBLICATIONS

GB2118682.0 Combined Search and Examination Report dated May 27, 2022, 8 pages.

(Continued)

*Primary Examiner* — Clifford B Madamba
(74) *Attorney, Agent, or Firm* — Galvani Smith PLLC; Rowan P. Smith

(57) ABSTRACT

A method performed in a system comprising a first party and a second party, the method comprising: generating, by the first party, a template of a first transaction having an input based on an output from a prior transaction associated with the second party; generating, by the first party, a message based on the template of the first transaction; generating, by the first party, a secret based on the message; generating, by the first party, a value based on the secret, wherein the secret cannot be derived from the value; generating, by the first party, a first puzzle transaction, wherein a first locking script of the first puzzle transaction comprises a knowledge proof configured to require an unlocking script to comprise the secret; publishing, by the first party, the first puzzle transaction to a first blockchain; obtaining, by the second party, the value based on the secret; signing, by the second party, the value based on the secret to create a signature; sending the signature from the second party to the first party; including, by the first party, the signature in the unlocking script of the first transaction and then sending the first transaction to a second blockchain; determining, by the (Continued)

second party and from the first transaction on the second blockchain, the message and the secret; and creating, by the second party, a second transaction which unlocks a first output of the first puzzle transaction based on the secret, and submitting the second transaction to the first blockchain.

15 Claims, 7 Drawing Sheets

(51) Int. Cl.

| | |
|---|---|
| ***H04L 9/00*** | (2022.01) |
| ***H04L 9/32*** | (2006.01) |

(56) References Cited

FOREIGN PATENT DOCUMENTS

| | | | |
|---|---|---|---|
| WO | 2018007916 | A1 | 1/2018 |
| WO | 2019220270 | A1 | 11/2019 |
| WO | 2020240293 | A1 | 12/2020 |
| WO | 2020240295 | A1 | 12/2020 |
| WO | 2020240297 | A1 | 12/2020 |
| WO | 2022135809 | A1 | 6/2022 |

OTHER PUBLICATIONS

PCT/EP2022/082968 International Search Report and Written Opinion dated Mar. 29, 2023, 15 pages.
Secretary of Commerce, "Secure Hash Standard (SHS) (FIPS Pub 180-4)", Federal Information Processing Standards Publication, Aug. 2015, 36 pages, Gaithersburg, MD.

* cited by examiner

Validated by running: Locking script from output 203 of $Tx_0$, together with Alice's unlocking script from input 202 of $Tx_1$. This checks that Alice's unlocking script in $Tx_1$ meets the condition(s) defined in the locking script of previous transaction $Tx_0$.

Figure 5

ALL

| | | |
|---|---|---|
| 0 | $Input_i$ | $Output_x$ |
| 1 | $\boldsymbol{Input_j}$ | $Output_y$ |
| 2 | | $Output_z$ |

NONE

| | | |
|---|---|---|
| 0 | $Input_i$ | $(Output_x)$ |
| 1 | $\boldsymbol{Input_j}$ | $(Output_y)$ |
| 2 | | $(Output_z)$ |

SINGLE

| | | |
|---|---|---|
| 0 | $Input_i$ | $(Output_x)$ |
| 1 | $\boldsymbol{Input_j}$ | $Output_y$ |
| 2 | | $(Output_z)$ |

ALL | ACP

| | | |
|---|---|---|
| 0 | $(Input_i)$ | $Output_x$ |
| 1 | $\boldsymbol{Input_j}$ | $Output_y$ |
| 2 | | $Output_z$ |

NONE | ACP

| | | |
|---|---|---|
| 0 | $(Input_i)$ | $(Output_x)$ |
| 1 | $\boldsymbol{Input_j}$ | $(Output_y)$ |
| 2 | | $(Output_z)$ |

SINGLE | ACP

| | | |
|---|---|---|
| 0 | $(Input_i)$ | $(Output_x)$ |
| 1 | $\boldsymbol{Input_j}$ | $Output_y$ |
| 2 | | $(Output_z)$ |

103a
103b
103c
103d
150
Alice
Bob
Charlie
Debbie
Blockchain
741a
741b
741c
Create Template
743
745a
745b
Create Puzzle transaction
747
749
753
751
Apply signature
755
757
Verify transaction published
759
761
Collect payment
763
765
Apply signature
767
766
Verify transaction published
769
771
Collect payment

SIGNATURE-BASED ATOMIC SWAP

CROSS REFERENCE TO RELATED APPLICATIONS

This application is the U.S. National Stage of International Application No. PCT/EP2022/082968 filed on Nov. 23, 2022, which claims the benefit of United Kingdom Patent Application No. 2118682.0, filed on Dec. 21, 2021, the contents of which are incorporated herein by reference in their entireties.

TECHNICAL FIELD

The present disclosure relates to a method for securely making transactions. The method is applicable to blockchain technology.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below.

Transactions that are submitted to the blockchain network are included in new blocks. New blocks are created by a process often referred to as "mining", which involves each of a plurality of the nodes competing to perform "proof-of-work", i.e., solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e., a number of digital tokens), to order a set of entries in a virtualised ledger or registry, to receive and process timestamp entries, and/or to time-order index pointers. A blockchain can also be exploited in order to layer additional functionality on top of the blockchain. For example, blockchain protocols may allow for storage of additional user data or indexes to data in a transaction. There is no pre-specified limit to the maximum data capacity that can be stored within a single transaction, and therefore increasingly more complex data can be incorporated. For instance, this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g., a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e., a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e., a reference) to such an output in a preceding transaction, and may further comprise an unlocking script for unlocking the locking script of the pointed-to output. So, consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring to the UTXO of a preceding transaction in a sequence of past transactions, but rather by reference to an absolute account balance. The current state of all accounts is stored by the nodes separate to the blockchain and is updated constantly.

SUMMARY

In some examples, a secret value based on the signature message of an unpublished transaction is determined. A puzzle transaction that can be unlocked by the secret is generated and published before the secret transaction is revealed. When the secret transaction is published it creates an atomic swap between two parties. This increases security by preventing either party from being able to "cheat" each other.

According to one aspect disclosed herein, there is provided a method performed in a system comprising a first party and a second party. The method comprises generating, by the first party, a template of a first transaction having an input based on an output from a prior transaction associated with the second party. The method can include generating, by the first party, a message based on the template of the first transaction and generating, by the first party, a secret based on the message. The method can also include generating, by the first party, a value based on the secret, wherein the secret cannot be derived from the value and generating, by the first party, a first puzzle transaction, wherein a first locking script of the first puzzle transaction comprises a knowledge proof configured to require an unlocking script to comprise the secret. The method may include the first party publishing the first puzzle transaction to a first blockchain and second party obtaining the value based on the secret and signing the value based on the secret to create a signature. The method may further comprise sending the signature from the second party to the first party and including, by the first party, the signature in the unlocking script of the first transaction and then sending the first transaction to the second blockchain. The method may also include determining, by the second party and from the first transaction on the second blockchain, the message and the secret and creating, by the second party, a second transaction which unlocks a first output of the first puzzle transaction based on the secret and submitting the second transaction to the first blockchain.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 5 is a schematic diagram of 6 different kinds of sighash flags.

DETAILED DESCRIPTION OF EMBODIMENTS

Example System Overview

Figure 1:
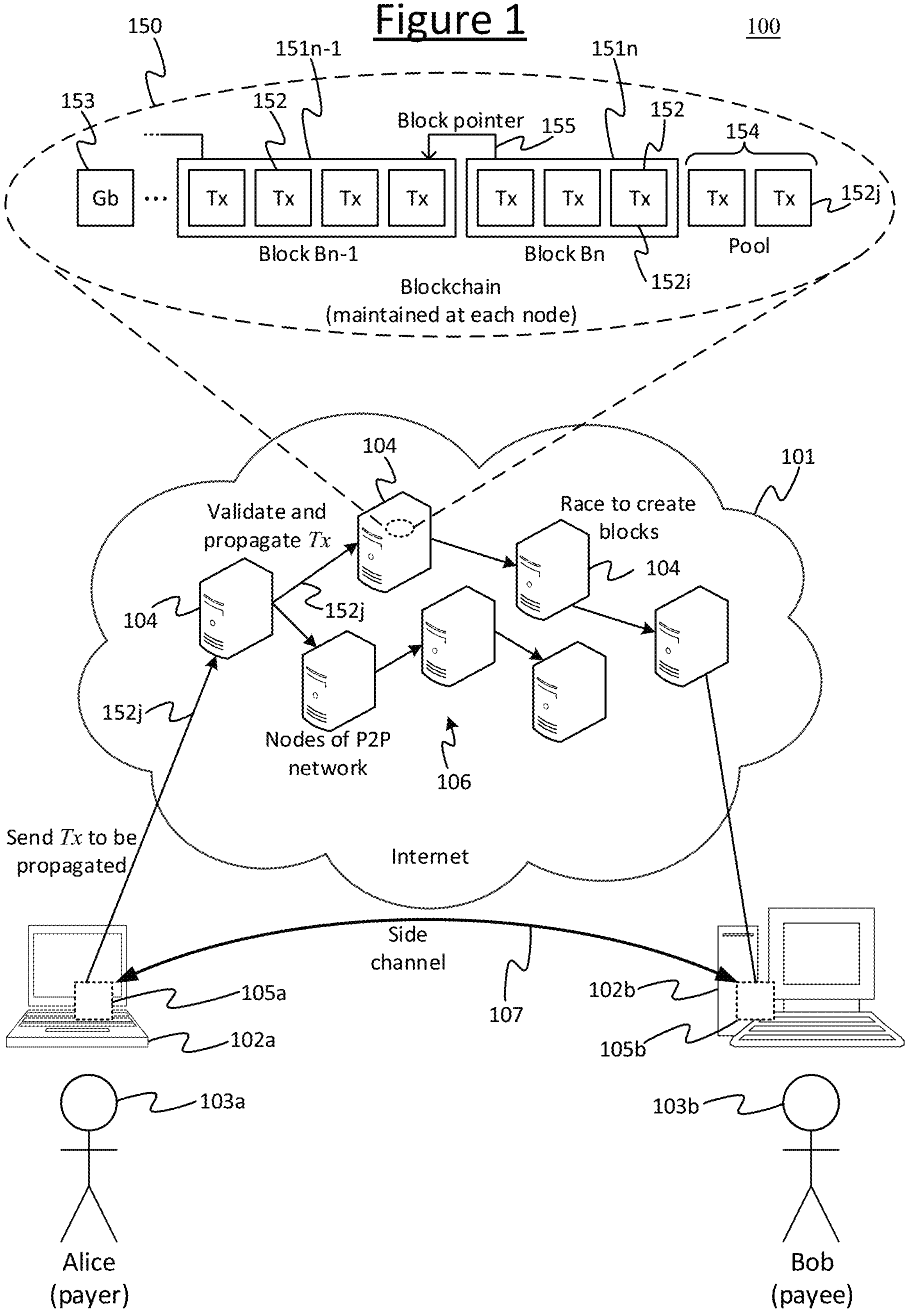
FIG. 1 is a schematic block diagram of a system for implementing a blockchain, FIG. 2 schematically illustrates some examples of transactions which may be recorded in a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g., one or more central processing units (CPUs), accelerator processors, application specific processors and/or field programmable gate arrays (FPGAs), and other equipment such as application specific integrated circuits (ASICs). Each node also comprises memory, i.e., computer-readable storage in the form of a non-transitory computer-readable medium or media. The memory may comprise one or more memory units employing one or more memory media, e.g., a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user to be unlocked and thereby redeemed or spent). Each input points back to the output of a preceding transaction 152, thereby linking the transactions.

Each block 151 also comprises a block pointer 155 pointing back to the previously created block 151 in the chain to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases, a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g., UTXO) is assigned (e.g., spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g., the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore, this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol.

Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g., having obtained a copy of the blockchain from a blockchain node 104).

Some or all of the parties 103 may be connected as part of a different network, e.g., a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g., one or more CPUs, GPUs, other accelerator processors, application specific processors, and/or FPGAs. The computer equipment 102 of each party 103 further comprises memory, i.e., computer-readable storage in the form of a non-transitory computer-readable medium or media. This memory may comprise one or more memory units employing one or more memory media, e.g., a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g., a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g., downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g., interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction **152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g., this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152**. Alternatively the condition could simply be a built-in feature of the node protocol, or be defined by a combination of the script and the node protocol.

On condition that the newly received transaction **152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106**.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction **152*j*). Once the proof-of-work has been done for the pool 154 including the new transaction 152*j*, it immutably becomes part of one of the blocks 151 in the blockchain 150. Each transaction 152** comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
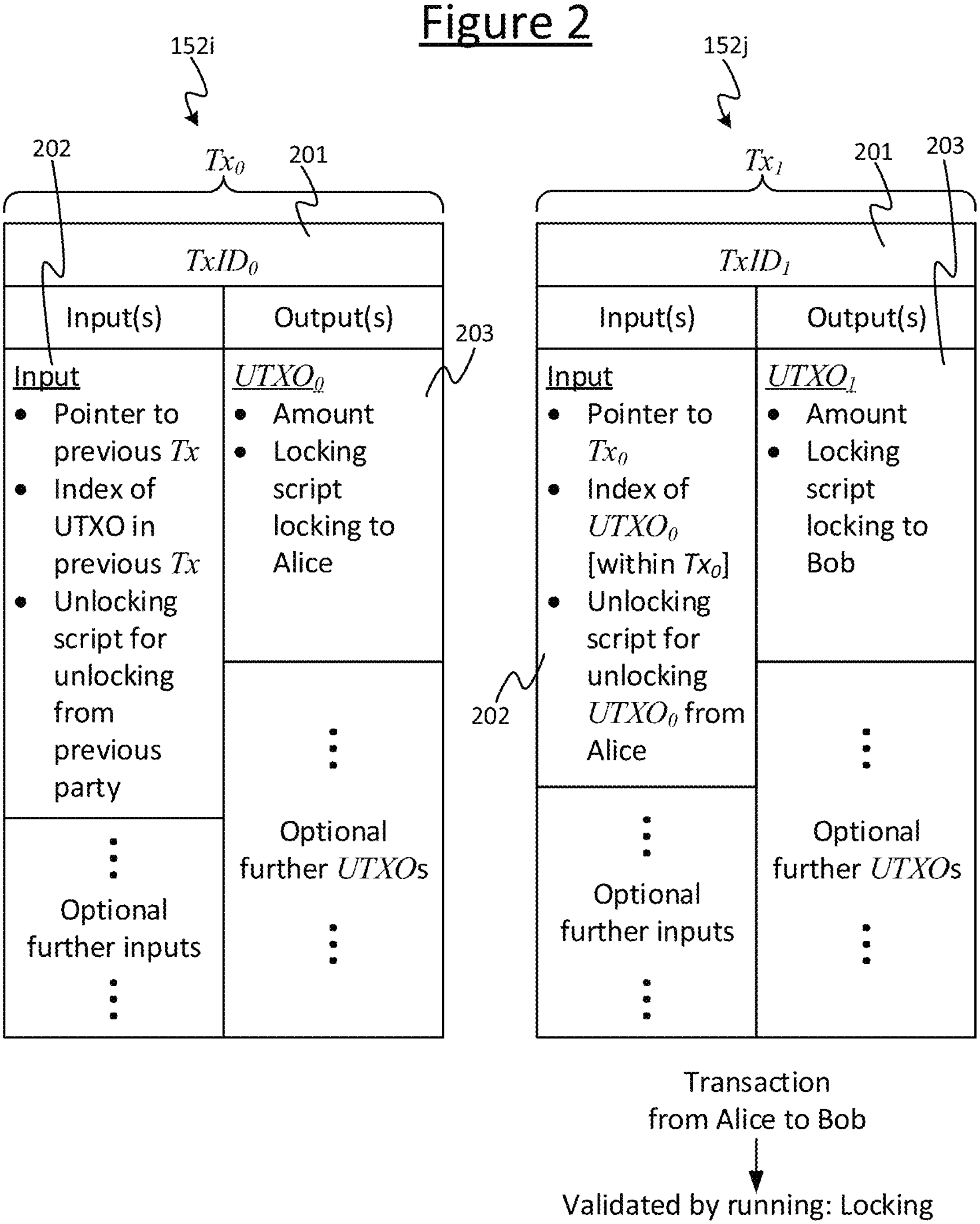

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "Tx-". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig PA] which requires a signature Sig PA of Alice in order for $UTXO_0$ to be redeemed (strictly, in order for a subsequent transaction attempting to redeem $UTXO_0$ to be valid). [Checksig PA] contains a representation (i.e. a hash) of the public key PA from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of Tx/further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Side Channel

As shown in FIG. 1, the client application on each of Alice and Bob's computer equipment 102*a*, 120*b*, respectively, may comprise additional communication functionality. This additional functionality enables Alice 103*a* to establish a separate side channel 107 with Bob 103*b* (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102*a*, 102*b*. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

Client Software

Figure 3A:
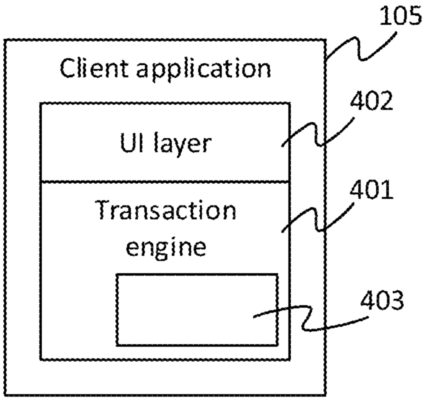
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
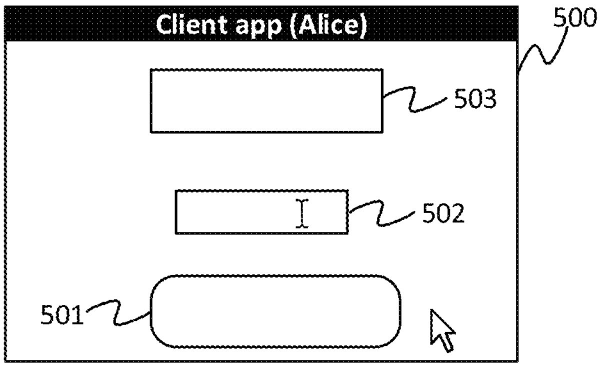
FIG. 3B is a schematic mock-up of an example user interface that may be presented by the client application of FIG. 3A.

FIG. 3B gives a mock-up of an example of the user interface (UI) 500 which may be rendered by the UI layer 402 of the client application 105*a* on Alice's equipment 102*a*. It will be appreciated that a similar UI may be rendered by the client 105*b* on Bob's equipment 102*b*, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands).

Alternatively or additionally, the UI elements may comprise one or more data entry fields 502. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

Node Software

Figure 4:
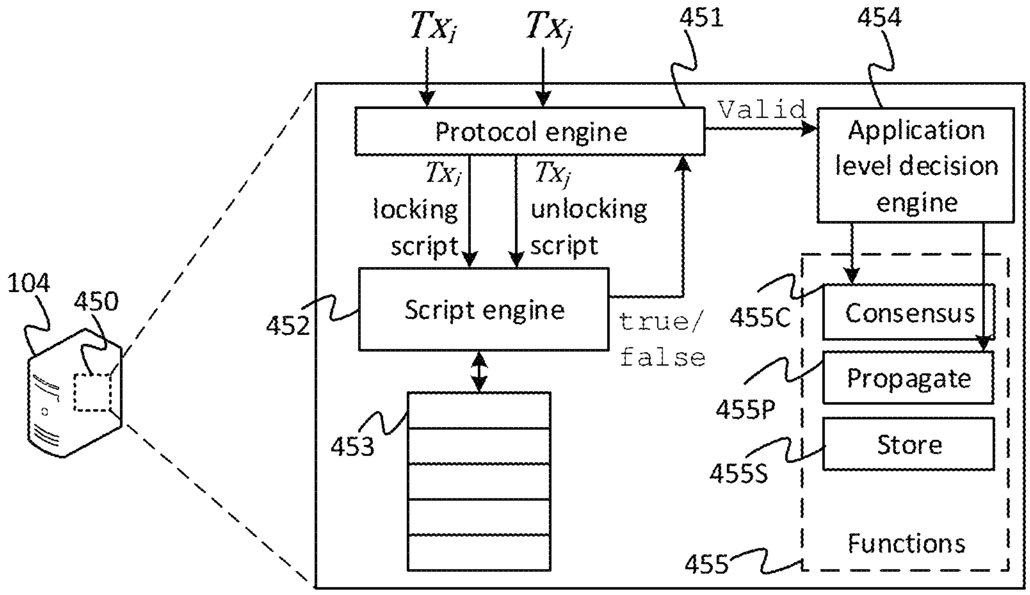
FIG. 4 is a schematic block diagram of some node software for processing transactions.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152*j* ($Tx_j$) is received having an input pointing to an output (e.g. UTXO) of another, preceding transaction 152*i* ($Tx_{m-1}$), then the protocol engine 451 identifies the unlocking script in Tx; and passes it to the script engine 452. The protocol engine 451 also identifies and retrieves $Tx_i$ based on the pointer in the input of $Tx_j$. $Tx_i$ may be published on the blockchain 150, in which case the protocol engine may retrieve $Tx_i$ from a copy of a block 151 of the blockchain 150 stored at the node 104. Alternatively, $Tx_i$ may yet to have been published on the blockchain 150. In that case, the protocol engine 451 may retrieve $Tx_i$ from the ordered set 154 of unpublished transactions maintained by the node 104. Either way, the script engine 451 identifies the locking script in the referenced output of $Tx_i$ and passes this to the script engine 452.

The script engine 452 thus has the locking script of $Tx_i$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_i$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This comprises the consensus module 455C adding $Tx_j$ to the node's respective ordered set of transactions 154 for incorporating in a block 151, and the propagation module 455P forwarding $Tx_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Blockchain Signature Messages

An example blockchain transaction is shown schematically in Table 1. The blockchain transaction may comprise a Bitcoin transaction, for example. In the example of Table 1, the transaction comprises two inputs and three outputs, however it will be understood that in other examples different numbers of inputs and outputs may be used.

TABLE 1

Example blockchain transaction
TxID
Version

| | Inputs | | | Outputs | |
|---|---|---|---|---|---|
| Index | Outpoint (TxID, index) | Unlocking Script | nSeq | Value | Locking Script |
| 0 | $Outpoint_i$ | $UnlockScript_i$ | $nSeq_i$ | $v_x$ | $LockScript_x$ |
| 1 | $Outpoint_j$ | [sig(m, a)] [P] | $nSeq_j$ | $v_y$ | $LockScript_y$ |
| 2 | | | | $v_z$ | $LockScript_z$ |

Locktime

In the example of Table 1, the outpoint that is used in index 2 comprises a pay-to-public-key-hash (P2PKH) locking script that specifies the public key P. Index 2 therefore requires an unlocking script that provides a signature generated using the associated private key, a, and a message, m.

Blockchain signature messages (e.g., Bitcoin signature messages) are derived from details of the transaction that is being signed. As such, in addition to proving that the user holds the appropriate private key, the signature also ensures the integrity of any details within the transaction that are included in the signature message. If signed transaction details are modified, the signature verification process will fail.

In the example of Table 1, the TxID field and unlocking script fields are never included in the signature message, since they must be created and/or edited after the signature has been generated. The Version and Locktime fields are always included in the signature message, as are the details of the input that the signature is used to validate (e.g., $Outpoint_j$ and $nSeq_j$). The message may also include details of the other inputs and any transaction outputs, depending on which sighash flag is used during signing.

Sighash Flags

FIG. 5 shows six schematics of inputs and outputs which are included in the signature message using six different sighash flags. Inputs or outputs that are bracketed (surrounded by parentheses) indicate that an element that will not be signed. Inputs or outputs that are included in the signature message are not bracketed (not surrounded by parentheses).

In the six sighash flag types shown in FIG. 5, each sighash flag type allows a signature to selectively endorse (and fix the details of) either all inputs and outputs, or various subsets. The different sets are illustrated in FIG. 5 based on a signature that unlocks the input in index 1. The input that the signature applies to is always signed.

According to an example, the full signature message based on the transaction illustrated in Table 1 and signing for input 1, is constructed as follows:

| | |
|---|---|
| m = | [Version][Hash(Outpoints)][Hash(nSeqs)][Outpoint$_k$]... [LockScriptLength$_k$][LockScript$_k$][Value$_k$][nSeq$_k$][Hash(Outputs)]... [Locktime][Flag] |

The single byte field Flag at the end of the message indicates the sighash flag, which may correspond to one of the six sighash flag types shown in FIG. 5. The fields [Hash(Outpoints)], Hash(nSeqs) and Hash(Outputs)) will contain different information depending on the sighash flag used. In cases where the hash fields would involve hashing an empty value (e.g., Hash(Outputs) when using the NONE flag), the field value is set to 0. In such examples, the notation Hash(empty) may be used to indicate these cases.

FIG. 5 illustrates the six sighash flag types and which inputs and outputs are included in the signature message for each. The top row of tables shows the 'regular' sighash flag variants which sign all inputs, and ALL, NONE or a SINGLE output. The bottom row of tables illustrates the 'anyone can pay' (ACP) variants, where only a single input—that in index 1 where the signature is placed—is included in the signing message.

Hash Puzzles

Hash Functions

Hash functions are cryptographic functions that convert an input of variable length into an output of a specific length. Hash functions may have the following properties:

- Deterministic: using the same input will always return the same output,
- Unpredictable: a small change in the input results in a large change in the output,
- One-way: given only the output it is computationally infeasible to reconstruct the input, and
- Collision-resistant: the likelihood of two inputs resulting in the same output value is extremely small.

The precise likelihood of a collision depends on the size of the output, with larger outputs resulting in fewer collisions. Examples of hash functions include RIPEMD-160, SHA-1 and SHA-256.

Bitcoin Hash Puzzles

Although Bitcoin transactions traditionally use a Pay to Public Key Hash (P2PKH) locking scripts, since the Genesis upgrade in February 2020 a variety of non-standardised locking scripts are valid. One of these is the hash puzzle, where a locking script is set such that a user must provide the preimage of a certain hash value in order to spend a UTXO.

For a pre-image, s, $H_{256}(s)$ may be the hash digest from the SHA-256 hash function. A Bitcoin hash puzzle for this value can be implemented by creating a UTXO that has the following locking script:

OP_SHA256<$H_{256}$(s)> OP_EQUALVERIFY

In order to spend this UTXO, a user must know the value of the preimage, s. This is used as the unlocking script in a transaction that spends the UTXO. During verification, the SCRIPT engine concatenates the unlocking and locking scripts to give:

<s> OP_SHA256<$H_{256}$(s)> OP_EQUALVERIFY

The OP_EQUALVERIFY code will return a value of 1 if and only if:

$$SHA-256(s)=H_{256}(s)$$

i.e., the transaction will only be valid if the user submitted the correct preimage. This style of locking script puzzle relies on the collision-resistant property of hash functions: only a user who knows the (secret) value of s can 'solve' the hash puzzle.

Security

Although a hash puzzle cannot be solved by anyone who does not know the required preimage, once a transaction is constructed by a user who does know the secret preimage value it must be broadcast to the Bitcoin network and published to the blockchain. There is a vulnerability to attack after the transaction has been sent to the Bitcoin network: any party who receives the transaction details becomes aware of the secret value, which is sufficient to authorise the spend of the puzzle UTXO. Since no signature is required in the unlocking script, a malicious party could change the details of the output without invalidating the transaction.

To address this malleability, hash puzzles can be combined with an additional OP_CHECKSIG requirement, to tie the UTXO to the public key of a specific user. For example, for a user with public key P, and using the notation $H_{160}(x)$ to represent the RIPEMD-160 hash of x, a hash puzzle locking script could be constructed as follows:

OP_SHA256<$H_{256}$(s)> OP_EQUALVERIFY OP_DUP OP_HASH160

<$H_{160}$(P)> OP_EQUALVERIFY OP_CHECKSIG

This puzzle requires the following input in the unlocking script:

<sig$_P$><P><s>

A puzzle for this format locks the UTXO to a particular user and can only be spent if the user knows the required secret preimage. The resulting transaction will be secure against malleation of any values that were included in the signature message used to create $sig_P$.

As noted above, the transaction information that is included in the signature message may depend on the sighash flag used.

Secret Access Tokens

Figure 6:
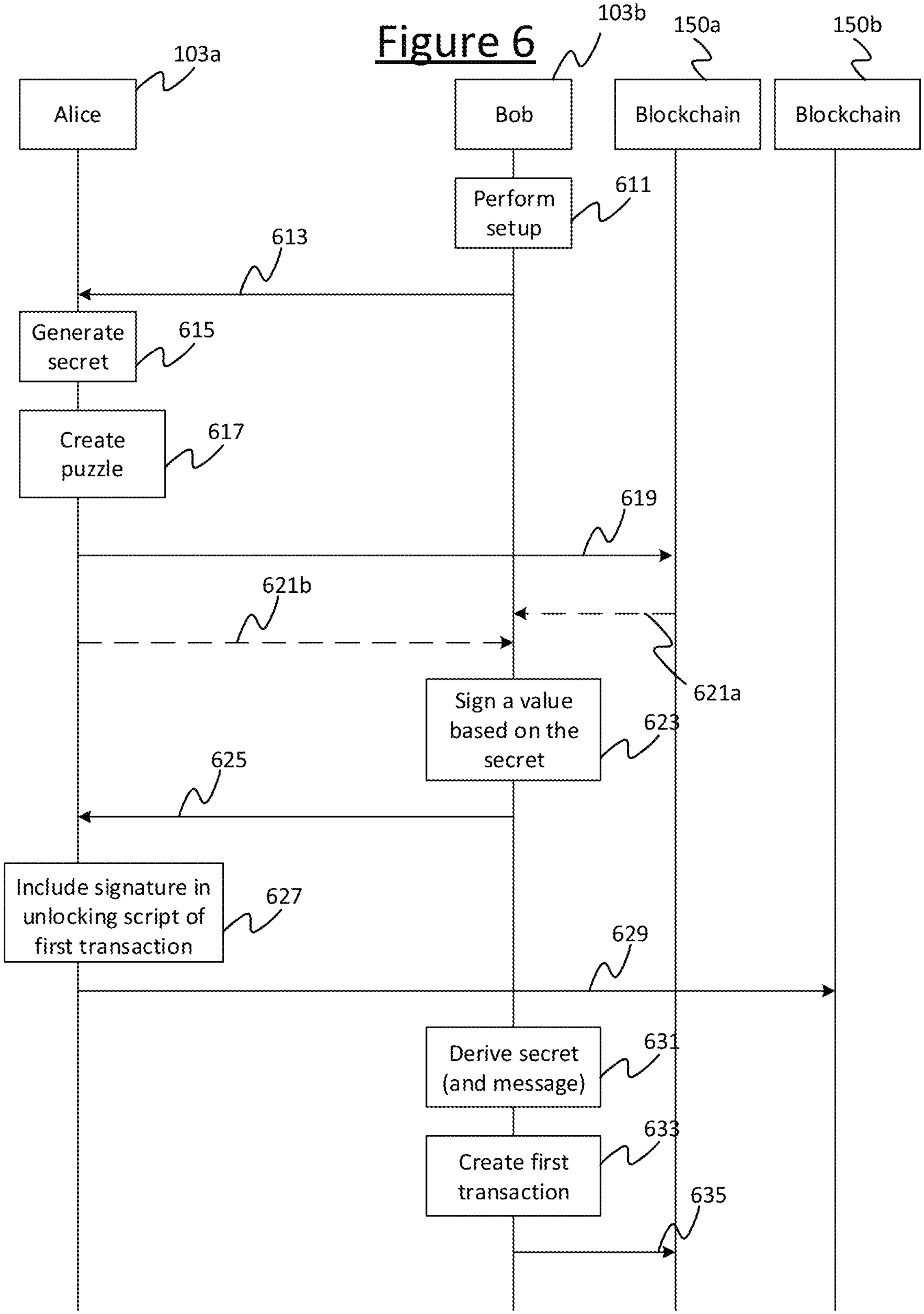
FIG. 6 is an example method flow.

FIG. 6 shows an example method for controlling access to a resource (e.g., a data resource) that is owned by a first party. The first party may comprise one or more users. In this example, the first party is Alice 103*a*. In some examples, the resource may comprise a data resource or a physical resource and Alice may be an oracle, or some other type of trusted third party. In some examples, a party (e.g., Bob 103*b*) may apply for access to the resource, and access is granted by the oracle if certain conditions (e.g., paying sufficient fee or passing identity checks) are met. In other examples, the method may be used for Bob 103*b* to purchase goods from Alice 103*a* in a transaction.

Alice 103*a* and Bob 103*b* may need to use one or more private keys across the protocols described in this section. $P_A$ and $P_B$ refer to a generic public key from a set of single-use private-public key pairs that Alice 103*a* or Bob 130*b*, respectively, hold. It will be appreciated that although they share notation each key is unique. The notation $$P_A^*, P_{B1}^*, P_{B2}^*$$

etc. refer to single, specific public keys that are used within the protocol. Each key has consistent notation, i.e., all instances of $$P_A^*$$

refer to the same public key.

As part of some signature algorithms such as the ECDSA signature algorithm, signature messages are double-hashed (i.e., the SHA-256 hashing algorithm is applied twice). The values of both the single- and double-hashes of the signature message, which for a message, m, are defined as follows:

$$\text{Single-hash}: h_1 = H_{256}(m)$$

$$\text{Double-hash}: h_2 = H_{256}(h_1) = H_{256}(H_{256}(m))$$

In some examples, hash algorithms other than the SHA-256 algorithm may be used (such as an R-puzzle algorithm or a different SHA algorithm, e.g. SHA-512). $h_1$ may be determined by hashing message m using a hashing algorithm once and $h_2$ may be determined by hashing message m twice using a hashing algorithm.

Alice 103*a* may considered to be a first party in some examples. Bob 103*b* may considered to be a second party in some examples.

S|ACP Tokens

At 611, Bob 103*b* generates $\text{TxID}_{setup}$, in which he assigns the fee required for access to his public key, $$P_{B1}^*.$$

Bob 103*b* can also include data pertaining to his application for access (e.g., encrypted identity proof) in an OP_RETURN of that output. The setup transaction may be published on-chain. Table 2 shows an example of $\text{TxID}_{setup}$. In all examples herein, $\text{TxID}_{setup}$ may be considered to be a prior transaction.

TABLE 2

$\text{TxID}_{setup}$ generated, in some examples, by Bob 103b at 611.
$\text{TxID}_{setup}$
Version

| | Input | | | Output | |
|---|---|---|---|---|---|
| Index | Outpoint | Unlocking Script | nSeq | Value | Locking Script |
| 0 | Bob's input | <Sig ALL> <$P_B$> | $n_0$ | fee | P2PKH $P_{B1}$* OP_RETURN <data> |
| 1 | | | | change | P2PKH $P_B$ |

Locktime

At 613, Bob 103*b* sends details of the UTXO: $\text{TxID}_{setup}$ \|\| 0 and another of his public keys $$P_{B2}^*$$

to Alice 103*a*.

At 615, Alice 103*a* generates a template of a first transaction, $\text{TxID}_{sale}$. The first transaction may have Bob's UTXO: $\text{TxID}_{setup}$ || 0 as an input and assigns the value to $$P_A^*.$$

In some examples, Bob 103*b* does not know the details of $$P_A^*.$$

TABLE 3

$\text{TxID}_{sale}$ template generated by Alice 103a at 615.
Template: $\text{TxID}_{sale}$
Version

| | Input | | | Output | |
|---|---|---|---|---|---|
| Index | Outpoint | Unlocking Script | nSeq | Value | Locking Script |
| 0 | $\text{TxID}_{setup}$ \|\| 0 | | $n_0$ | fee | P2PKH $P_A$* |

Locktime $\text{TxID}_{sale}$ may be considered to be a first transaction and has an input based on the output of the prior transaction $\text{TxID}_{setup}$. An output of the first transaction may be locked to a public key of the first party.

At 615. Alice 103*a* calculates $h_1$ and $h_2$, the single- and double-hash of the S|ACP signature message, m, of the template for $\text{TxID}_{sale}$. As such the message is based on the template of the first transaction. Message m may be determined using the following, for example:

$$m = [\text{Verison}][\text{Hash}(\text{Outpoint}_0)][\text{Hash}(nSeq_0)][\text{Outpoint}_0][LockScriptLength_0][LockScript_0][\text{Value}_0][nSeq_0][\text{Hash}(\text{Output}_0)][\text{Locktime}][S|ACP]$$

As seen in the above equation, in this example, an S|ACP sighash flag is used.

A secret, $h_1$, can then be determined based on message m. In some examples, $h_1$ can then be determined by hashing message m, for example by using a SHA-256 hash.

A value based on $h_1$ i.e., a value based on the secret, is denoted as $h_2$. In some examples, $h_1$, can then be determined by hashing secret $h_1$, for example by using a SHA-256 hash.

Although Bob 103*b* knows the details of the input, he cannot guess the details of the output that Alice 103*a* has defined, so the value $h_1$ is unknown to Bob 103*b*. This allows $h_1$ to act as the secret.

At 617, Alice 103*a* creates $\text{TxID}_{puzzle}$ that assigns a small value (which in some examples may be sufficient to cover the transaction fee at 631) to an output with a locking script hash puzzle that requires the secret $h_1$ to solve.

TABLE 4

| TxID$_{puzzle}$ generated by Alice 103a at 617. TxID$_{puzzle}$ Version | | | | | |
|---|---|---|---|---|---|
| | Input | | | Output | |
| Index | Outpoint | Unlocking Script | nSeq | Value | Locking Script |
| 0 | Alice's input | <Sig ALL><$P_A$> | $n_0$ | dust | Puzzle |
| 1 | | | | x | P2PKH $P_A$ |
| | | Locktime | | | |

For example, the puzzle in the locking script may take the following form:

OP_SHA256 <$h_2$> OP_EQUALVERIFY $P2PKH\ P^*_{B2}$

This UTXO can only be spent by Bob 103*b*, and only once he knows the value of the secret, $h_1$ that is the preimage to $h_2$. Note that it is possible for Alice 103*a* to generate multiple puzzle UTXOs in a single transaction. Each will have a unique value of $h_2$ and be associated with one user's public key.

At 619, Alice 103*a* signs TxID$_{puzzle}$ and it is published to a first blockchain 150*a*. In some examples, first blockchain 150*a* is the same blockchain as second blockchain 150*b*. In some examples, first blockchain 150*a* is a different blockchain compared to second blockchain 150*b*. For example, the first blockchain 150*a* may be a proof-of-work blockchain and the second blockchain may e be a proof-of-stake blockchain 150*b*, or vice versa.

At 621*b*, Alice 103*a* sends Bob 103*b* the Merkle proof of TxID$_{puzzle}$ on chain and the value $h_2$. Note that the information passed to Bob 103*b* relates to the puzzle transaction (which is published on chain). The sale transaction TxID$_{sale}$ is a secret held by Alice 103*a* as a template at this stage.

In some examples, Bob 103*b* may receive the value $h_2$ from Alice 103*a* as in 621*b*. In other examples, Bob 103*b* may retrieve value $h_2$ from first blockchain 150*a* as shown in 621*a*.

The value $h_2$ now plays two roles. It is:

the hash digest that Bob must find the preimage of to solve the access puzzle, and the double hash of the message that must be signed to authorise the spend of Bob's payment UTXO (TxID$_{setup}$ || 0).

At 623, Bob 103*b* may check that TxID$_{puzzle}$ has the same value of $h_2$ he received from Alice 103*a* (if he did receive a value of $h_2$ at 621*b* rather than retrieving the value of $h_2$ using 621*a*) and that the locking script also contains P2PKH $P^*_{B2}$.

The value of $h_2$ received by bob 103*b* from Alice 103*a* may be considered to be a candidate value. If so, Bob 103*b* knows that Alice 103*a* cannot use Bob's signature to authorise the sale transaction without revealing the transaction details that the secret requires for access.

At 623, Bob 103*b* signs $h_2$ using the private key associated with $P^*_{B1}$ and sends the signature to Alice 103*a* at 625.

At 627, once any conditions of Bob's access have been met (for example identity verification based on data supplied by Bob), Alice 103*a* applies Bob's signature to TxID$_{sale}$ template generated by Alice at 615. Since Bob 103*b* signed a signature message derived using the S|ACP sighash flag in this example, the resulting signature places no restrictions on the information in any of the inputs or outputs in other index positions. This means Alice 103*a* is free to combine payments from multiple users into a single transaction without invalidating any of the users' signatures. Alice 103*a* may include the signature in the unlocking script of the first transaction and then sending the first transaction to the second blockchain.

TABLE 5

| TxID$_{sale}$ generated at 627 and published at 629. TxID$_{sale}$ Version | | | | | |
|---|---|---|---|---|---|
| | Input | | | Output | |
| Index | Outpoint | Unlocking Script | nSeq | Value | Locking Script |
| . . . | . . . | . . . | . . . | . . . | . . . |
| N | TxID$_{setup}$ \|\| 0 | <Sig S\ACP><$P_{B1}$*> | $n_N$ | fee | P2PKH $P_A$* |
| . . . | . . . | . . . | . . . | . . . | . . . |
| | | Locktime | | | |

Alice 103*a* publishes the sale transaction at 629 to the second blockchain 150*b*.

At 629, when Alice 103*a* sends TxID$_{sale}$ to be published, Alice 103*a* notifies Bob 103*b*. Alternatively, or additionally, Bob 103*b* can identify the transaction by monitoring blockchain 150*b* for the UTXO he created in TxID$_{setup}$ or his public key $P^*_{B1}$.

At 631, Bob 103*b* derives the secret $h_1$ (the single hash of the S|ACP signature message based on the index where his UTXO is the input) that is required to spend the puzzle UTXO TxID$_{puzzle}$ || 0. Bob 103*b* can also determine the message m from the published TxID$_{sale}$.

At 633, Bob 103*b* creates TxID$_{access}$, with TxID$_{puzzle}$ || 0 as an input. TxID$_{access}$ may be considered to comprise a second transaction. In some examples, this UTXO has sufficient value to cover the transaction fee of the present transaction. The unlocking script required is the secret $h_1$ with a valid signature and associated public key $P^*_{B2}$.

When TxID$_{access}$ is published and presented on chain, Bob's purchase from Alice 103*a* is triggered. This may comprise triggering access from Alice 103*a* to Bob 103*b*.

TABLE 6

| TxID$_{access}$ created at 633. TxID$_{access}$ Version | | | | | |
|---|---|---|---|---|---|
| | Input | | | Output | |
| Index | Outpoint | Unlocking Script | nSeq | Value | Locking Script |
| 0 | TxID$_{puzzle}$ \|\| 0 | < $h_1$ > < sig $P^*_{B2}$> <$P^*_{B2}$> | $n_0$ | dust | P2PKH $P_B$ |
| Locktime | | | | | |

The method and system of FIG. 6 ensures that Alice 103*a* cannot collect Bob's fee without granting Bob 103*b* access (or providing him with relevant goods or services)+. TxID$_{sale}$ simultaneously transfers the access fee to Alice 103*a* and reveals the access secret to Bob 103*b*, implementing what can be thought of as an atomic swap.

If Bob 103*b* decides to withdraw his application before this swap occurs, he can create an alternative transaction that spends TxID$_{setup}$|| 0. Bob's fee is returned and TxID$_{sale}$ is no longer valid, so the access secret cannot be revealed on-chain. Similarly, if the conditions for Bob's access are not met (for example the identity verification fails), Alice 103*a* cannot publish TxID$_{sale}$, and Bob 103*b* retains control of TxID$_{setup}$ || 0.

The fact that the puzzle UTXO is locked to Bob's public key means that even though Alice 103*a* knows the required secret, she cannot spend the puzzle UTXO. For this reason, the puzzle UTXO may have a dust (or even zero) value, in case access is not granted to Bob 103*b*. However, the signature requirement is an important aspect of the system as it ensures that Alice 103*a*, upon receiving Bob's signature for TxID$_{sale}$, cannot deny Bob 103*b* access by spending the puzzle UTXO herself before she publishes TxID$_{sale}$.

In the example of FIG. 6, TxID$_{sale}$ and TxID$_{access}$ share no common public keys and appear independent to an outside observer, so user privacy is maintained.

In some examples, in TxID$_{puzzle}$ it is possible to use an R-puzzle in place of a hash puzzle.

The secret, $h_1$, will be used as an ephemeral key during ECDSA signature generation, such that $r=[h_1 \cdot G]_x$ The puzzle locking script checks that the appropriate value of r has been used.

As Bob 103*b* does not know the details of the output that Alice 103*a* defines for TxID$_{sale}$, he cannot predict the value of the secret, $h_1$. However, the system requires Alice 103*a* to define her output address for the fee at the very beginning of the process, and it cannot be changed. This means that even if Alice 103*a* combines access tokens for multiple users into one TxID$_{sale}$, there must be a unique output defined for each input. Relative to defining a single output, this substantially increases the transaction size and the associated transaction fee Alice 103*a* must pay.

In the below section "NONE|ACP tokens", some of the tokens are adapted to give Alice 103*a* flexibility in controlling the output of TxID$_{sale}$.

NONE|ACP Tokens

In the example described above with respect to FIG. 6, a S|ACP sighash flag is used for TxID$_{sale}$. A further example is now considered (also with respect to FIG. 6), with a NONE|ACP sighash flag used for TxID$_{sale}$ rather than S|ACP.

At 611, Bob 103*b* can request a unique public key $$P_A^*$$

from Alice 103*a*. Bob 103*b* may generate TxID$_{setup}$, in which he assigns the fee required for access to a 2-of-3 multisig account associated with $$P_A^*, P_{B1}^* \text{ and } P_{B2}^*.$$

Bob 103*b* may also include data pertaining to his application for access (e.g., encrypted identity proof) in an OP_RETURN of that output. The setup transaction is published on-chain.

TABLE 7

| TxID$_{setup}$ TxID$_{setup}$ Version | | | | | |
|---|---|---|---|---|---|
| | Input | | | Output | |
| Index | Outpoint | Unlocking Script | nSeq | Value | Locking Script |
| 0 | Bob's input | < Sig ALL >< $P_B$ > | $n_0$ | fee | Multisig 2-of-3 ($P^*_{B1}$, $P^*_{B2}$, $P^*_A$) OP_RETURN <data> |
| 1 | | | | change | P2PKH $P_B$ |
| Locktime | | | | | |

At 613, Bob **103*b*** sends details of the UTXO: $TxID_{setup}$ || 0 and another of his public keys $$P^*_{B3}$$

to Alice.

At 615, Alice **103*a*** creates a template of $TxID_{sale}$ that has a multisig input but no output

TABLE 8

| Template: $TxID_{sale}$ | | | | | |
|---|---|---|---|---|---|
| Version | | | | | |
| | Input | | | Output | |
| Index | Outpoint | Unlocking Script | nSeq | Value | Locking Script |
| 0 | $TxID_{setup}$ \|\| 0 | | $n_0$ | | |
| Locktime | | | | | |

At 615, Alice **103*a* uses a standard locktime but randomises $n_0$ so that Bob 103*b* does not know the full details of the input for $TxID_{sale}$. The NONE|ACP signature message does not sign an output, but in this way the signature message (and its hash digest $h_1$) is based on information that is not known to Bob 103*b*** until $TxID_{sale}$ is published on-chain.

Alice **103*a*** calculates $h_1$ and $h_2$, the single- and double-hash of the NONE|ACP signature message, m, of the template for $TxID_{sale}$:

$$m = [\text{Verison}][\text{Hash}(\text{Outpoint}_0)][\text{Hash}(nSeq_0)][\text{Outpoint}_0][LockScriptLength_0][LockScript_0][\text{Value}_0][nSeq_0][\text{Hash}(\text{Empty})][\text{Locktime}][\text{NONE}|ACP]$$

As noted above, an R-puzzle may be used instead of a hashing algorithm to calculate $h_1$ and $h_2$. It should be noted that any other suitable algorithm may be used of a hashing algorithm or an R-puzzle algorithm.

At 617, Alice **103*a* creates $TxID_{puzzle}$ with an input from Alice 103*a*** that assigns a dust value to an output with a locking script hash puzzle that requires the secret $h_1$ to solve.

TABLE 9

| $TxID_{puzzle}$ | | | | | |
|---|---|---|---|---|---|
| Version | | | | | |
| | Input | | | Output | |
| Index | Outpoint | Unlocking Script | nSeq | Value | Locking Script |
| 0 | Alice's input | < Sig ALL >< $P_A$ > | $n_0$ | dust | Puzzle |
| 1 | | | | x | P2PKH $P_A$ |
| Locktime | | | | | |

The puzzle in the locking script may take the following form:

$$\text{OP\_SHA256} < h_2 > \text{OP\_EQUALVERIFY } P2PKH\ P^*_{B3}$$

Alice **103*a* signs $TxID_{puzzle}$ and it is published at 619. At 621*b*, Alice 103*a* sends Bob 103*b* the location of $TxID_{puzzle}$ on chain and the value $h_2$. Bob 103*b* can then use this to retrieve $TxID_{puzzle}$. Alternatively, Bob 103*b* can retrieve $TxID_{puzzle}$ directly from blockchain 150*a* at 621*a***.

At 623, Bob **103*b* checks that $TxID_{puzzle}$ has the same value of $h_2$ he received from Alice 103*a***, and that the locking script also contains P2PKH $$P^*_{B3}.$$

If so, Bob **103*b* knows that Alice 103*a* cannot use Bob's signature to authorise the sale transaction without revealing the transaction details that the secret he requires for access, $h_1$, is derived from. Bob 103*b*** signs $h_2$ using the private key associated with $$P^*_{B1} \text{ (or } P^*_{B2})$$

and sends the signature to Alice **103*a* at 625**.

At 627, once any conditions of Bob's access have been met (for example identity verification based on the data supplied by Bob **103*b*), Alice 103*a*** applies Bob's signature to $TxID_{sale}$.

Since Bob **103*b* and other users signed a signature message derived using the NONE|ACP sighash flag, Alice 103*a* can combine payments from multiple users as inputs into a single transaction without invalidating any of the users' signatures. As the outputs have not been signed, Alice 103*a*** can set just one output collating the fees from all users to a single address.

TABLE 10

| $TxID_{sale}$ | | | | | |
|---|---|---|---|---|---|
| Version | | | | | |
| | Input | | | Output | |
| Index | Outpoint | Unlocking Script | nSeq | Value | Locking Script |
| . . . | . . . | . . . | . . . | Fee total | P2PKH $P_A$ |
| N | $TxID_{setup}$ \|\| 0 | < Sig NONE\|ACP > < $P^*_{B1}$ > < Sig ALL >< $P^*_A$ > | $n_N$ | | |
| . . . | . . . | . . . | . . . | | |
| Locktime | | | | | |

At 627, Alice 103*a* adds her own signature to complete the multisig requirement. Alice's signature can use a sighash that signs the output details, such as sighash ALL, to ensure that her output cannot be modified.

At 629, Alice 103*a* publishes $TxID_{sale}$ on chain.

At 631, Bob 103*b* identifies $TxID_{sale}$ based on the UTXO or his public key. Bob derives the secret $h_1$ (the single hash of the NONE|ACP signature message based on the index where his UTXO is the input) that is required to spend the puzzle UTXO $TxID_{puzzle} \| 0$.

At 633, Bob 103*b* creates $TxID_{access}$, with $TxID_{puzzle} \| 0$ as an input. The unlocking script required is the secret $h_1$ with a valid signature and associated public key $$P^*_{B3}.$$

Bob 103*b* may include an additional input to fund the transaction fee, since the puzzle UTXO had a dust value. When $TxID_{access}$ is published on chain at 635, Bob's access is triggered.

TABLE 11

| | | | | | |
|---|---|---|---|---|---|
| | | $TxID_{access}$ | | | |
| | | $TxID_{access}$ | | | |
| | | Version | | | |
| | Input | | | Output | |
| Index | Outpoint | Unlocking Script | nSeq | Value | Locking Script |
| 0 | $TxID_{puzzle} \| 0$ | < $h_1$ > < sig $P^*_{B3}$ > <$P^*_{B3}$> | $n_0$ | x | P2PKH $P_B$ |
| 1 | Bob's Input | < sig $P_B$ > <$P_B$> | $n_1$ | | |
| | | Locktime | | | |

When using the NONE|ACP sighash flag, by basing the secret, $h_1$ on the NONE|ACP sighash flag, users do not fix the details of any outputs when they sign $h_2$. This allows Alice 103*a* to set the output details of $TxID_{sale}$ at the point when she finalises the transaction, and means she only needs to define a single output, which will reduce the transaction fee for $TxID_{sale}$, and simplifies Alice's key management. To secure the output details, Alice 103*a* can provides a signature, which in some examples can be achieved by setting the inputs that contain users' fees to have a multisig requirement.

Alice 103*a* controls one key for the multisig UTXOs, two signatures are required to authorise the spend, and so Alice 103*a* cannot take the fee without Bob's agreement. Bob 103*b* controls two of the keys, and therefore retains the power to abort the protocol if necessary, by producing the required two signatures to spend the multisig UTXO.

Although the NONE|ACP system may reduce the size of $TxID_{sale}$ by limiting the number of outputs that are necessary, having multisig requirements for the inputs may counteract this due to increased unlocking script sizes. Threshold signature systems can provide many of the benefits of a multisig system without inflating transaction sizes, but they cannot be applied in the system designed here since they require all parties to sign the same signature message (i.e., Alice 103*a* could not use a different sighash flag to Bob 103*b*).

An alternative solution that does not require introducing any signature from Alice 103*a* is for Alice 103*a* to have an arrangement with a trusted block producer, via whom the $TxID_{sale}$ can be published without being broadcast to the wider network. In this case the inputs to $TxID_{sale}$ could remain P2PKH UTXOs locked to a single user's public key, as described in above with respect to FIG. 6 for the S|ACP tokens.

Bob 103*b* should not be able to guess or brute force compute the value of the secret. For the S|ACP tokens Bob cannot know the details of Alice's output until the transaction is published on-chain. Any P2PKH locking script will contain a 20 byte (160 bit) public key, which is considered secure enough to prevent brute force attacks. (If additional security is required, Alice 103*a* could include an additional secret nonce of any size in the output locking script—for example using OP_PUSH OP_DROP or OP_RETURN—to increase the security level). In contrast, for NONE|ACP tokens, the output is not included in the derivation of $h_1$, and so it cannot be the unknown element in the signature message. Using the sequence number of the input as the value that is unknown to Bob 103*b*. However, the nSeq field is in some examples limited in size (4 bytes=32 bits) making a brute force attack by Bob much more feasible. Other values that are included in the signature message are the version and the locktime. However, these values may in some examples both also be capped at 4 bytes, so if Alice 103*a* were to set all three values randomly (and note that locktime cannot be set entirely randomly without delaying the publication of the transaction), the security would only be 96 bits. Thus, the system described using NONE|ACP sighash flags may be more appropriate for situations where Bob's computational power is constrained, e.g., a device connected to the IoT network, and the time between Alice 102*a* passing $h_2$ to Bob 102*b* and Bob 102*b* exercising his access is short. In situations where Bob 102*b* has high computational power or the time between Alice 102*a* passing $h_2$ to Bob 102*b* and Bob 102*b* exercising his access is long, it may be preferred to use a S|ACP sighash flag for $TxID_{sale}$.

Chained Secret Access Tokens

In some examples, the secret access tokens are chained. One use of this could be in supply chain management, for example, as each transfer between parties in the supply chain takes place, a transaction is made on-chain that reveals the secret required for the party who is handing off the goods to be paid. The swap may occur between the goods and the payment for the stage of the supply chain that has just been completed.

For example, consider a supply chain in which there is an oracle, Alice 103*a*, two parties, Bob 103*b* and Charlie 103*c*, who are responsible for goods within the chain, and a final party, Debbie 103*d*, who receives the goods. It will be understood that in some examples, a similar method could be used with a different number of parties in the supply chain may be used.

In some examples, the final party, Debbie 103$d$, could act as the oracle for the supply chain, and would assume the roles assigned to Alice. The notation described above is applied, where each party owns public keys denoted by their initial as a subscript, and where keys without the * superscript are a generic label for a set of single-use keys belonging to a party.

At 741$a$, the first party in the chain, Bob 103$b$, sends Alice 103$a$ the details of a UTXO he controls on chain ($TxID_{Bob} \| i_B$) associated with $$P^*_{B1}.$$

For simplicity we assume this UTXO has a value that is sufficient to cover the transaction fees for the chain of transactions with a dust amount left over. Bob 103$b$ also sends Alice another of his public keys, $$P^*_{B2}.$$

At 741$b$, parties in the middle of the chain (Charlie 103$c$, here) send Alice 103$a$ two unused public keys, and at 741$c$ the final party in the chain Debbie 103$d$ sends Alice 103$a$ one unused public key. Alice 103$a$ knows the details of $$P^*_{B1}, P^*_{B2}, P^*_{C1}, P^*_{C2}, P^*_{D1}.$$

Chain parties do not know the details of each other's public keys.

At 743, Alice 103$a$ creates templates for each transaction that will occur in the chain, and calculates a secret based on each transaction. In this example. Alice 103$a$ creates a template for transactions $TxID_{chain1}$ (considered a first transaction in this example) and $TxID_{chain2}$ (considered a third transaction in this example), which represent the handover points in the supply chain. Alice 103$a$ knows the details of the inputs and outputs that will form these transactions, but these details are not known by the parties in the chain.

TABLE 12

| $TxID_{chain1}$ | | | | | |
|---|---|---|---|---|---|
| Template: $TxID_{chain1}$ | | | | | |
| Version | | | | | |
| | Input | | | Output | |
| Index | Outpoint | Unlocking Script | nSeq | Value | Locking Script |
| 0 | $TxID_{Bob} \| i_B$ | | $n_0$ | x | P2PKH $P^*_{C1}$ |
| Locktime | | | | | |

TABLE 13

| $TxID_{chain2}$ | | | | | |
|---|---|---|---|---|---|
| Template: $TxID_{chain2}$ | | | | | |
| Version | | | | | |
| | Input | | | Output | |
| Index | Outpoint | Unlocking Script | nSeq | Value | Locking Script |
| 0 | $TxID_{chain1} \| 0$ | | $n_0$ | dust | P2PKH $P^*_{D1}$ |
| Locktime | | | | | |

From each transaction, Alice 103$a$ can calculate the signature message that will be used. Note that this could be a S|ACP sig hash flag, as described above but it could also be an ALL flag since the chain transactions are not expected to contain any other inputs or outputs.

The message for $TxID_{chain1}$ using a sighash ALL flag would be:

$$m_1 = [\text{Verison}][\text{Hash}(\text{Outpoint}_0)][\text{Hash}(nSeq_0)][\text{Outpoint}_0]$$
$$[LockScriptLength_0][LockScript_0][\text{Value}_0][nSeq_0][\text{Hash}(\text{Output}_0)]$$
$$[\text{Locktime}][\text{ALL}]$$

from which Alice 103$a$ can calculate the secret value $h_1$ and its hash $h_{12}$. These will be used as the basis for the puzzle that Bob 103$b$ will need to solve to get his payment. Alice 103$a$ can perform the same operations on $TxID_{chain2}$ to derive $m_2$ (a second message), $h_{21}$ (a second secret) and $h_{22}$ (a second Value, which is based on the second secret).

At 745$a$, Alice 103$a$ sends the details of the template for $TxID_{chain1}$ to Charlie 103$c$ only. The details of the template for $TxID_{chain1}$ are not sent to Bob 103$b$. At 745$b$, Alice 103$a$ sends the details of the template for $TxID_{chain2}$ to Debbie 103$d$ only. The details of the template for $TxID_{chain2}$ are not sent to Charlie 103$c$.

At 747, Alice 103$a$ creates a puzzle transaction that contains the payments to Bob 103$b$ and Charlie 103$c$ for their part in the supply chain. Bob 103$b$ and Charlie 103$c$, as parties within the supply chain, require payment for their service. Alice 103$a$ creates a puzzle transaction with two outputs, which may have the following locking scripts:

$$\text{OP\_SHA256} < h_{12} > \text{OP\_EQUALVERIFY } P2PKH\ P^*_{B2} \quad \text{Puzzle}_1$$
$$\text{OP\_SHA256} < h_{22} > \text{OP\_EQUALVERIFY } P2PKH\ P^*_{C2} \quad \text{Puzzle}_2$$

TABLE 14

| $TxID_{puzzle}$ | | | | | |
|---|---|---|---|---|---|
| $TxID_{puzzle}$ | | | | | |
| Version | | | | | |
| | Input | | | Output | |
| Index | Outpoint | Unlocking Script | nSeq | Value | Locking Script |
| 0 | Alice's input | < Sig ALL >< $P_A$ > | $n_0$ | $Pay_1$ | $Puzzle_1$ |
| 1 | | | | $Pay_2$ | $Puzzle_2$ |
| 2 | | | | x | P2PKH $P_A$ |
| Locktime | | | | | |

$Puzzle_1$ and $Puzzle_2$ may comprise independent puzzles, or the $Puzzle_1$ may comprise $Puzzle_2$.

At 749, Alice 103*a* signs and publishes the puzzle transaction. Alice 103*a* sends Bob 103*b* the Merkle proof of $TxID_{puzzle}$ and the value $h_{12}$. Alice 103*a* sends Charlie 103*c* the Merkle proof of $TxID_{puzzle}$ and the value $h_{22}$.

At 751, Bob 103*b* transfers goods to Charlie 103*c*. Bob 103*b* checks that $TxID_{puzzle1}$ online contains his expected fee, that the public key it locks the funds to is $$P^*_{B2},$$

and that the value $h_{12}$ in the puzzle script is the same as the value that Alice 103*a* sent to him. Bob 103*b* delivers the goods to Charlie 103*c*. Bob 103*b* produces a signature using the message $h_{12}$ using the private key associated with $$P^*_{B1}.$$

Bob 103*b* gives the signature to Charlie 103*c*, and at 753 Charlie who can apply the signature to the template of $TxID_{chain1}$, and then publishes $TxID_{chain1}$ online. Bob 103*b* verifies the transaction has been published at 757 and transfers the goods to Charlie 103*c* at 759.

TABLE 15

| $TxID_{chain1}$<br>$TxID_{chain1}$<br>Version | | | | | |
|---|---|---|---|---|---|
| Input | | | | Output | |
| Index | Outpoint | Unlocking Script | nSeq | Value | Locking Script |
| 0 | $TxID_{Bob} \parallel i_B$ | < sig $P^*_{B1}$ ><br><$P^*_{B1}$> | $n_0$ | x | P2PKH $P^*_{C1}$ |
| | | Locktime | | | |

At 761, Bob 103*b* can collect his payment. From the details of $TxID_{chain1}$, Bob 103*b*, can calculate $h_{11}$, which is the secret that is required to unlock the output in $TxID_{puzzle}$ that contains Bob's payment.

TABLE 16

| $TxID_{PayBob}$<br>$TxID_{PayBob}$<br>Version | | | | | |
|---|---|---|---|---|---|
| Input | | | | Output | |
| Index | Outpoint | Unlocking Script | nSeq | Value | Locking Script |
| 0 | $TxID_{puzzle} \parallel 0$ | < $h_{11}$ ><br>< sig $P^*_{B2}$ ><br><$P^*_{B2}$> | $n_0$ | $Pay_1$ | P2PKH $P_B$ |
| | | Locktime | | | |

At 763, Charlie 103*c* transfers goods to Debbie. Charlie 103*c* checks that $TxID_{puzzle2}$ online contains his expected fee, that the public key it locks the funds to is $$P^*_{C2},$$

and that the value $h_{22}$ in the puzzle script is the same as the value that Alice 103*a* sent to him. Charlie 103*c* delivers the goods to Debbie 103*d*. Charlie 103*c* produces a signature using the message $h_{22}$ using the private key associated with $$P^*_{C1}.$$

Charlie 103*c* gives the signature to Debbie 103*d*, who can apply it to the template of $TxID_{chain2}$ at 765 and publishes $TxID_{chain2}$ online at 766. At 767, Charlie 103*c* verifies the transaction has been published and transfers the goods to Debbie 103*d*.

TABLE 17

| $TxID_{chain2}$<br>$TxID_{chain2}$<br>Version | | | | | |
|---|---|---|---|---|---|
| Input | | | | Output | |
| Index | Outpoint | Unlocking Script | nSeq | Value | Locking Script |
| 0 | $TxID_{chain1} \parallel 0$ | < sig $P^*_{C1}$ ><br><$P^*_{C1}$> | $n_0$ | dust | P2PKH $P^*_{D1}$ |
| | | Locktime | | | |

At 771, Charlie 103*c* can obtain his payment. From the details of $TxID_{chain2}$, Charlie 103*c*, can calculate $h_{21}$, which is the secret that is required to unlock the output in $TxID_{puzzle}$ that contains Charlie's payment.

TABLE 18

| $TxID_{PayCharlie}$<br>$TxID_{PayCharlie}$<br>Version | | | | | |
|---|---|---|---|---|---|
| Input | | | | Output | |
| Index | Outpoint | Unlocking Script | nSeq | Value | Locking Script |
| 0 | $TxID_{puzzle} \parallel 1$ | < $h_{21}$ ><br>< sig $P^*_{C2}$ ><br><$P^*_{C2}$> | $n_0$ | $Pay_2$ | P2PKH $P_C$ |
| | | Locktime | | | |

Figure 7:
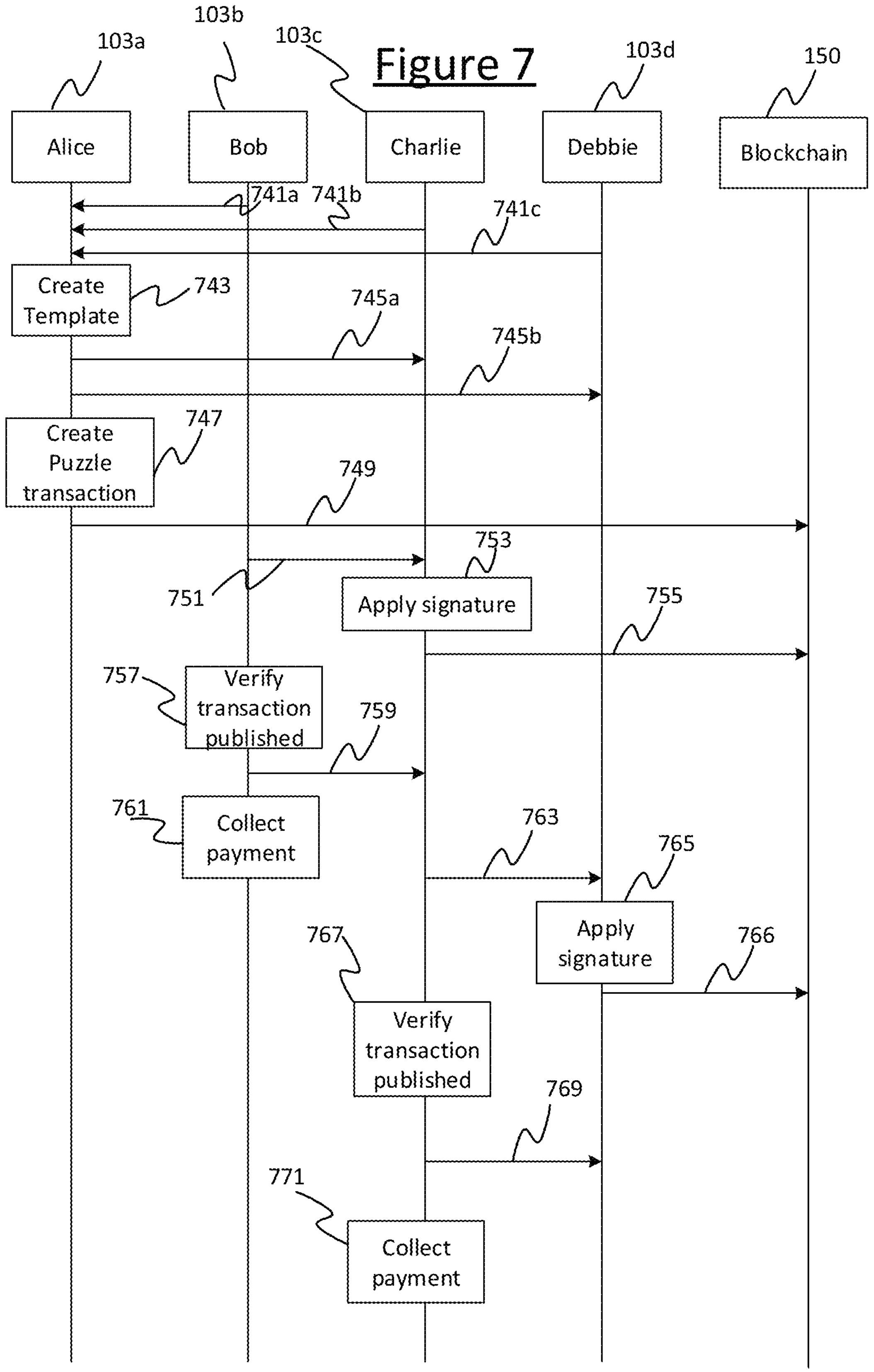
FIG. 7 is an example method flow.

The method as described above with respect to FIG. 7 allows each party in the chain to transfer the goods to the subsequent party knowing that they will be paid. By waiting for the publication of the corresponding chain transaction on chain, each party knows the secret they require to unlock their payment is available to them.

If two parties were to collude, for example, that Charlie 103*c* agreed to share the details of $TxID_{chain1}$ (from which Bob 103*b* can determine the secret he requires for payment) with Bob 103*b*, without the transfer of goods occurring, then Charlie 103*c* knows that he cannot deliver the goods to Debbie 104*d*, and therefore will not receive his payment. Even if Bob 103*b* says he will split the fee he receives with Charlie 103*c*, Charlie 103*c* has no proof this will occur, and so is not motivated to collude.

For the puzzle transactions, a check that a signature from the expected chain party is included in the unlocking script can be included to ensure the fees cannot be stolen by another party once the secret value is revealed on-chain. For this use case it may be appropriate for the locking script of the puzzle transactions to have a 1-of-2 multisig signing condition (with Alice 103*a* as one possible signatory), so that if the chain party does not fulfil their role, the funds are not locked in the puzzle UTXO. In this situation, Alice 103_a_ is a trusted party who is independent from the supply chain.

The system can be adapted to integrate information from IoT devices, for example a thermometer packed with the goods, to ensure that the agreed conditions of the supply service are met. To implement this, the puzzle transaction (which contains the payment) could have a 1-of-n signature requirement (the chain party plus n−1 IoT devices). All IoT devices would have the details of the secret so that they can spend the puzzle transaction at any time and would be programmed to spend the transaction under certain conditions, for example if the temperature of the goods exceeded a certain threshold.

Cross Chain

Note that although they are linked by the secret value $h_2$, $TxID_{sale}$ and $TxID_{puzzle}$ are entirely independent in terms of inputs and outputs. Therefore, $TxID_{sale}$ and $TxID_{puzzle}$ could occur on different blockchains. This would allow for an atomic swap to occur between the two chains (e.g., blockchain 150_a_ and blockchain 150_b_ in an example where these blockchains are different from each other). This could be used for example for exchanging coins or tokens in one chain for those in another.

Both parties involved in the exchange would need to control public keys on both chains. If $TxID_{sale}$ occurs on chain 1 (Table 19 below) then $TxD_{puzzle}$ occurs on chain 2 (Table 20 below). Bob's UTXO on chain 1 is exchanged for Alice's UTXO on chain 2.

TABLE 19

| $TxID_{sale}$ (Chain 1)<br>$TxID_{sale}$ (Chain 1)<br>Version | | | | | |
|---|---|---|---|---|---|
| | Input | | | Output | |
| Index | Outpoint | Unlocking Script | nSeq | Value | Locking Script |
| 0 | Bob's UTXO | < Sig ALL >< $P_B^1$ > | $n_B$ | x | P2PKH $P_A^1$ |
| | | Locktime | | | |

TABLE 20

| $TxID_{puzzle}$ (Chain 2)<br>$TxID_{puzzle}$ (Chain 2)<br>Version | | | | | |
|---|---|---|---|---|---|
| | Input | | | Output | |
| Index | Outpoint | Unlocking Script | nSeq | Value | Locking Script |
| 0 | Alice's UTXO | < Sig ALL >< $P_A^2$ > | $n_A$ | y | Puzzle to $P_B^2$ |
| | | Locktime | | | |

CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However, it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all the described functions of creating, publishing, propagating, and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all the functions of creating, publishing, propagating, and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all the roles of creating, publishing, propagating, and storing blocks. The functions of such a network entity/element may be implemented in hardware in the same way described above with reference to a blockchain node 104.

It will be appreciated that the above embodiments have been described by way of example only. More generally there may be provided a method, apparatus, or program in accordance with any one or more of the following Statements.

Statement 1: A method performed in a system comprising a first party and a second party, the method comprising: generating, by the first party, a template of a first transaction having an input based on an output from a prior transaction associated with the second party; generating, by the first party, a message based on the template of the first transaction; generating, by the first party, a secret based on the message; generating, by the first party, a value based on the secret, wherein the secret cannot be derived from the value; generating, by the first party, a first puzzle transaction, wherein a first locking script of the first puzzle transaction comprises a knowledge proof configured to require an unlocking script to comprise the secret; publishing, by the first party, the first puzzle transaction to a first blockchain; obtaining, by the second party, the value based on the secret; signing, by the second party, the value based on the secret to create a signature; sending the signature from the second party to the first party; including, by the first party, the signature in the unlocking script of the first transaction and then sending the first transaction to the second blockchain; determining, by the second party and from the first transaction on the second blockchain, the message and the secret;

and creating, by the second party, a second transaction which unlocks a first output of the first puzzle transaction based on the secret, and submitting the second transaction to the first blockchain.

Statement 2: A method according Statement 1, wherein an output of the first transaction is locked to a public key of the first party.

Statement 3: A method according to any preceding Statement, wherein the first puzzle transaction is locked to a public key of the second party.

Statement 4: A method according to any preceding Statement, wherein obtaining, by the second party, the value based on the secret, comprises: obtaining, by the second party, the value based on the secret from the first puzzle transaction; and wherein the method comprises: receiving, by the second party and from the first party, a candidate value for the value based on the secret from the first puzzle transaction; checking, by the second party, that the candidate value and the value based on the secret from the first puzzle transaction are equal.

Statement 5: A method according to any preceding Statement, wherein the secret comprises an input and corresponding output of the first transaction.

Statement 6: A method according to any preceding Statement, wherein the secret comprises all inputs and all outputs of the first transaction.

Statement 7: A method according to any of Statements 1 to 5, wherein the secret comprises an input of the first transaction and none of the outputs of the first transaction.

Statement 8: A method according to any preceding Statement, wherein an input of the first transaction unlocks a multiple signature output of the prior transaction, wherein the multiple signature output is locked to one or more public keys of: the first party; and/or the second party.

Statement 9: A method according to any preceding Statement, wherein the first transaction comprises an output locked to the public key of a third party, and wherein the method comprises: generating, by the first party, a template of a third transaction that spends the output of the first transaction; generating, by the first party, a second message based on the template of the third transaction; generating, by the first party, a second secret based on the second message; generating, by the first party, a second value based on the second secret, wherein the second secret cannot be derived from the second value; generating, by the first party, a second puzzle transaction, wherein a second locking script of the second puzzle transaction comprises a knowledge proof configured to require a second unlocking script to comprise the second secret; signing, by a third party, the second value based on the second secret to create a second signature; sending the second signature from the third party to a fourth party; obtaining, by a fourth party, the third transaction, including, by the fourth party, the second signature in an unlocking script of the third transaction and then sending the third transaction to the second blockchain; determining, by the third party and from the third transaction on the second blockchain, the second message and the second secret; and creating, by the third party, a fourth transaction which unlocks an output of the second puzzle transaction based on the second secret, and submitting the second transaction to the first blockchain.

Statement 9A. A method according to any of Statements 1 to 8, wherein a fifth transaction comprises an output locked to the public key of a third party, and wherein the method comprises: generating, by the first party, a template of a third transaction that spends the output of the fifth transaction; generating, by the first party, a second message based on the template of the third transaction; generating, by the first party, a second secret based on the second message; generating, by the first party, a second value based on the second secret, wherein the second secret cannot be derived from the second value; generating, by the first party, a second puzzle transaction, wherein a second locking script of the second puzzle transaction comprises a knowledge proof configured to require a second unlocking script to comprise the second secret; signing, by a third party, the second value based on the second secret to create a second signature; sending the second signature from the third party to a fourth party; obtaining, by a fourth party, the third transaction, including, by the fourth party, the second signature in an unlocking script of the third transaction and then sending the third transaction to the second blockchain; determining, by the third party and from the third transaction on the second blockchain, the second message and the second secret; and creating, by the third party, a fourth transaction which unlocks an output of the second puzzle transaction based on the second secret, and submitting the second transaction to the first blockchain.

Statement 10: A method according to Statement 9 or Statement 9A, wherein the first puzzle transaction and second puzzle transaction are independent puzzle transactions.

Statement 11: A method according to Statement 9 or Statement 9A, wherein the first puzzle transaction comprises the second puzzle transaction.

Statement 12: A method according to any preceding Statement, wherein the first blockchain and the second blockchain are different blockchains.

Statement 13: A method according to any preceding Statement, wherein the first blockchain and the second blockchain are the same blockchain.

Statement 14: A method according to any preceding Statement, wherein the secret is generated by hashing the message.

Statement 15: A method according to any preceding Statement, wherein the secret is generated by using an R-puzzle.

Statement 16: A method performed by a first party, the method comprising: generating a template of a first transaction having an input based on an output from a prior transaction associated with a second party; generating a message based on the template of the first transaction; generating a secret based on the message; generating a value based on the secret, wherein the secret cannot be derived from the value; generating a first puzzle transaction, wherein a first locking script of the first puzzle transaction comprises a knowledge proof configured to require an unlocking script to comprise the secret; publishing the first puzzle transaction to a first blockchain; receiving a signature from the second party, wherein the signature is created by the second party using the value based on the secret; including the signature in the unlocking script of the first transaction and then sending the first transaction to the second blockchain.

Statement 17: A method according to Statement 16, wherein an output of the first transaction is locked to a public key of the first party.

Statement 18: A method according to Statement 16 or 17, wherein the first puzzle transaction is locked to a public key of the second party.

Statement 19: A method according to any of Statements 16 to 18, comprising: sending, to the second party, a candidate value for the value based on the secret from the first puzzle transaction.

Statement 20: A method according to any of Statements 16 to 19, wherein the secret comprises an input and corresponding output of the first transaction.

Statement 21: A method according to any of Statements 16 to 20, wherein the secret comprises all inputs and all outputs of the first transaction.

Statement 22: A method according to any of Statements 16 to 21, wherein the secret comprises an input of the first transaction and none of the outputs of the first transaction.

Statement 23: A method according to any of Statements 16 to 22, wherein an input of the first transaction unlocks a multiple signature output of the prior transaction, wherein the multiple signature output is locked to one or more public keys of: the first party; and/or or the second party.

Statement 24: A method according to any of Statements 16 to 23, wherein the first transaction comprises an output locked to the public key of a third party, and wherein the method comprises: generating a template of a third transaction that spends the output of the first transaction; generating a second message based on the template of the third transaction; generating a second secret based on the second message; generating a second value based on the second secret, wherein the second secret cannot be derived from the second value; and generating, by the first party, a second puzzle transaction, wherein a second locking script of the second puzzle transaction comprises a knowledge proof configured to require a second unlocking script to comprise the second secret.

Statement 24A: A method according to any of Statements 16 to 23, wherein a fifth transaction comprises an output locked to the public key of a third party, and wherein the method comprises: generating a template of a third transaction that spends the output of the fifth transaction; generating a second message based on the template of the third transaction; generating a second secret based on the second message; generating a second value based on the second secret, wherein the second secret cannot be derived from the second value; and generating, by the first party, a second puzzle transaction, wherein a second locking script of the second puzzle transaction comprises a knowledge proof configured to require a second unlocking script to comprise the second secret.

Statement 25: A method according to Statement 24 or Statement 24A, wherein the first puzzle transaction and second puzzle transaction are independent puzzle transactions.

Statement 26: A method according to Statement 24 or Statement 24A, wherein the first puzzle transaction comprises the second puzzle transaction.

Statement 27: A method according to any of Statements 16 to 26, wherein the first blockchain and the second blockchain are different blockchains.

Statement 28: A method according to any of Statements 16 to 27, wherein the first blockchain and the second blockchain are the same blockchain.

Statement 29: A method according to any of Statements 16 to 28, wherein the secret is generated by hashing the message.

Statement 30: A method according to any of Statements 16 to 29, wherein the secret is generated by using an R-puzzle.

Statement 31: A method performed by a second party, the method comprising: obtaining a value generated by a first party based on a secret, wherein the secret cannot be derived from the value, wherein the secret is based on a message generated by the first party based on a template of a first transaction, and wherein a template of the first transaction has an input based on an output from a prior transaction associated with the second party; signing the value based on the secret to create a signature; sending the signature to the first party, wherein the first party includes the signature in the unlocking script of the first transaction and then sends the first transaction to the second blockchain; determining, from the first transaction on the second blockchain, the message and the secret; and creating, by the second party, a second transaction which unlocks a first output of a first puzzle transaction based on the secret, and submitting the second transaction to the first blockchain, wherein a first locking script of the puzzle transaction comprises a knowledge proof configured to require an unlocking script to comprise the secret.

Statement 32: A method according to Statement 31, wherein the first transaction is locked to a public key of the first party.

Statement 33: A method according to Statement 31 or Statement 32, wherein the first puzzle transaction is locked to a public key of the second party.

Statement 34: A method according to any of Statements 31 to 33, wherein obtaining the value based on the secret, comprises: obtaining the value based on the secret from the first puzzle transaction; and wherein the method comprises: receiving, from the first party, a candidate value for the value based on the secret from the first puzzle transaction; checking that the candidate value and the value based on the secret from the first puzzle transaction are equal.

Statement 35: A method according to any of Statements 31 to 34, wherein the secret comprises an input and corresponding output of the first transaction.

Statement 36: A method according to any of Statements 31 to 35, wherein the secret comprises all inputs and all outputs of the first transaction.

Statement 37: A method according to any of Statements 31 to 34, wherein the secret comprises an input of the first transaction and none of the outputs of the first transaction.

Statement 38: A method according to any of Statements 31 to 37, wherein an input of the first transaction unlocks a multiple signature output of the prior transaction, wherein the multiple signature output is locked to one or more public keys of: the first party; and/or or the second party.

Statement 39: A method according to any of Statements 31 to 38, wherein the first transaction comprises an output locked to the public key of a third party, and wherein the first party performs: generating a template of a third transaction that spends the output of the first transaction; generating a second message based on the template of the third transaction; generating a second secret based on the second message; generating a second value based on the second secret, wherein the second secret cannot be derived from the second value; and generating, by the first party, a second puzzle transaction, wherein a second locking script of the second puzzle transaction comprises a knowledge proof configured to require a second unlocking script to comprise the second secret.

Statement 39A: A method according to any of Statements 31 to 38, wherein a fifth transaction comprises an output locked to the public key of a third party, and wherein the first party performs: generating a template of a third transaction that spends the output of the fifth transaction; generating a second message based on the template of the third transaction; generating a second secret based on the second message; generating a second value based on the second secret, wherein the second secret cannot be derived from the second value; and generating, by the first party, a second puzzle transaction, wherein a second locking script of the second puzzle transaction comprises a knowledge proof configured to require a second unlocking script to comprise the second secret.

Statement 40: A method according to Statement 39 or Statement 39A, wherein the first puzzle transaction and second puzzle transaction are independent puzzle transactions.

Statement 41: A method according to Statement 39 or Statement 39A, wherein the first puzzle transaction comprises the second puzzle transaction.

Statement 42: A method according to any of Statements 31 to 41, wherein the first blockchain and the second blockchain are different blockchains.

Statement 43: A method according to any to any of Statements 31 to 42, wherein the first blockchain and the second blockchain are the same blockchain.

Statement 44: A method according to any of Statements 31 to 43, wherein the secret is generated by hashing the message.

Statement 45: A method according to any of Statements 31 to 44, wherein the secret is generated by using an R-puzzle.

Statement 46: Computer equipment comprising: memory comprising one or more memory units; and processing apparatus comprising one or more processing units, wherein the memory stores code arranged to run on the processing apparatus, the code being configured so as when on the processing apparatus to perform the method of any of Statements 1 to 45.

Statement 47: A computer program embodied on computer-readable storage and configured as, when run on one or more processors, to perform the method of any of Statements 1 to 45.

According to another aspect disclosed herein, there may be provided a method comprising the actions of the first user and the second user.

According to another aspect disclosed herein, there may be provided a method comprising the actions of the first user.

According to another aspect disclosed herein, there may be provided a method comprising the actions of the second user.

According to another aspect disclosed herein, there may be provided a system comprising the computer equipment of the first user and the second user.

According to another aspect disclosed herein, there may be provided a system comprising the computer equipment of the first user.

According to another aspect disclosed herein, there may be provided a system comprising the computer equipment of the second user.

The invention claimed is:

1. A computer-implemented method performed in a system comprising a first party and a second party, the method comprising:

generating, by computer equipment of the first party, a template data structure of a first blockchain transaction having an input field based on an output field from a prior blockchain transaction associated with the second party;

generating, by computer equipment of the first party, a message by applying a digital cryptographic signature scheme to the template of the first blockchain transaction;

generating, by computer equipment of the first party, a cryptographic secret by applying a cryptographic hash function to the message;

generating, by computer equipment of the first party, a cryptographic value based on the cryptographic secret, wherein the cryptographic secret cannot be derived from the cryptographic value;

generating, by computer equipment of the first party, a first puzzle blockchain transaction comprising, as part of a first locking script, a knowledge proof configured to, when executed by a script engine of a blockchain node, cause the blockchain node to verify that an unlocking script of a second blockchain transaction comprises the cryptographic secret;

sending, by computer equipment of the first party, the first puzzle blockchain transaction to a blockchain node of a first blockchain network to cause the first puzzle blockchain transaction to be published on a first blockchain;

obtaining, by computer equipment of the second party, the cryptographic value based on the cryptographic secret;

applying, by computer equipment of the second party, a digital cryptographic signature scheme to the cryptographic value to create a digital cryptographic signature;

sending, by computer equipment of the second party, the digital cryptographic signature to the first party;

including, by computer equipment of the first party, the digital cryptographic signature in the unlocking script of the template of the first blockchain transaction and then sending the first blockchain transaction to a blockchain node of a second blockchain network to cause the first blockchain transaction to be published on a second blockchain;

determining, by computer equipment of the second party, the message and the cryptographic secret from the first blockchain transaction published on the second blockchain; and creating, by computer equipment of the second party, the second blockchain transaction which, when executed by a script engine of a blockchain node, causes the blockchain node to verify that the unlocking script of the second blockchain transaction comprises the cryptographic secret, thereby unlocking a first output of the first puzzle blockchain transaction, and submitting the second blockchain transaction to the first blockchain.

2. The computer-implemented method of claim 1, wherein an output of the first blockchain transaction is locked to a public key of the first party.

3. The computer-implemented method of claim 1, wherein the first puzzle transaction is locked to a public key of the second party.

4. The computer-implemented method of claim 1, wherein obtaining, by the second party, the cryptographic value based on the cryptographic secret, comprises: obtaining, by the second party, the cryptographic value based on the cryptographic secret from the first puzzle blockchain transaction; and wherein the method comprises:

receiving, by computer equipment of the second party and from computer equipment of the first party, a candidate value for the cryptographic value based on the cryptographic secret from the first puzzle blockchain transaction;

checking, by computer equipment of the second party, that the candidate value and the cryptographic value based on the cryptographic secret from the first puzzle blockchain transaction are equal.

5. The computer-implemented method of claim 1, wherein the cryptographic secret comprises:

an input field and corresponding output field of the first blockchain transaction;

all input fields and all output fields of the first blockchain transaction; or an input field of the first blockchain transaction and none of the output fields of the first blockchain transaction.

6. The computer-implemented of claim 1, wherein an input field of the first blockchain transaction unlocks a multiple signature output field of the prior blockchain transaction, wherein the multiple signature output is locked to one or more public keys of: the first party; and/or the second party.

7. The computer-implemented method of claim 1, wherein a fifth blockchain transaction comprises an output field locked to a public key of a third party, and wherein the method comprises:

generating, by computer equipment of the first party, a template of a third blockchain transaction that spends the output of the fifth blockchain transaction;

generating, by computer equipment of the first party, a second message by applying a digital cryptographic signature scheme to the template of the third blockchain transaction;

generating, by computer equipment of the first party, a second cryptographic secret by applying a cryptographic hash function to the second message;

generating, by computer equipment of the first party, a second cryptographic value the second cryptographic secret, wherein the second cryptographic secret cannot be derived from the second cryptographic value;

generating, by computer equipment of the first party, a second puzzle blockchain transaction comprising, as part of a second locking script of the second puzzle, a knowledge proof configured to, when executed by a script engine of a blockchain node, cause the blockchain node to verify that a second unlocking script of a fourth blockchain transaction comprises the second cryptographic secret;

applying, by computer equipment of a third party, a digital cryptographic signature scheme to the second cryptographic value to create a second digital cryptographic signature;

sending, by computer equipment of the third party, the second digital cryptographic signature to a fourth party;

obtaining, by computer equipment of a fourth party, the third blockchain transaction, including, by computer equipment of the fourth party, the second digital cryptographic signature in an unlocking script of the third blockchain transaction and then sending the third blockchain transaction to a blockchain node of the second blockchain network to cause the third blockchain transaction to be published on the second blockchain;

determining, by computer equipment of the third party, the second message and the second cryptographic secret and from the third transaction on the second blockchain; and creating, by computer equipment of the third party, a-the fourth blockchain transaction which, when executed by a script engine of a blockchain node, causes the blockchain node to verify that the unlocking script of the fourth blockchain transaction comprises the second cryptographic secret, thereby unlocking an output of the second puzzle blockchain transaction, and submitting the second blockchain transaction to the first blockchain.

8. The computer-implemented method of claim 7, wherein the first puzzle blockchain transaction and second puzzle blockchain transaction are independent puzzle blockchain transactions.

9. The computer-implemented method of claim 7, wherein the first puzzle blockchain transaction comprises the second puzzle blockchain transaction.

10. The computer-implemented method of claim 1, wherein the first blockchain and the second blockchain are different blockchains.

11. The computer-implemented method of claim 1, wherein the first blockchain and the second blockchain are the same blockchain.

12. The computer-implemented method of claim 1, wherein the cryptographic secret is generated by hashing the message and/or by using an R-puzzle.

13. A computer-implemented method comprising:

obtaining, by computer equipment of a second party, a cryptographic value generated by a first party based on a cryptographic secret, wherein the cryptographic secret cannot be derived from the cryptographic value, wherein the cryptographic secret is generated by computer equipment of the first party by applying a cryptographic hash function to a template of a first blockchain transaction, and wherein the template of the first blockchain transaction has an input field based on an output field from a prior blockchain transaction associated with the second party;

applying, by computer equipment of the second party, a digital cryptographic signature scheme to the cryptographic value to create a digital cryptographic signature;

sending, by computer equipment of the second party, the digital cryptographic signature to the first party, wherein the first party includes the digital cryptographic signature in an unlocking script of the template of the first blockchain transaction and then sends the first blockchain transaction to a blockchain node of a second blockchain network to cause the first blockchain transaction to be published on a second blockchain;

determining, by computer equipment of the second party, the message and the cryptographic secret from the first transaction on the second blockchain; and creating, by computer equipment of the second party, a second blockchain transaction which, when executed by a script engine of a blockchain node, causes the blockchain node to verify that the unlocking script of the second blockchain transaction comprises the cryptographic secret, thereby unlocking a first output of a first puzzle blockchain transaction and submitting the second blockchain transaction to the first blockchain, wherein the first puzzle blockchain transaction comprises, as part of a first locking script, a knowledge proof configured to, when executed by a script engine of a blockchain node, cause the blockchain node to verify that an unlocking script of the second blockchain transaction comprises the cryptographic secret;

wherein the template of the first blockchain transaction, the cryptographic secret and the first puzzle blockchain transaction are generated by computer equipment of the first party.

14. Computer equipment, comprising:

memory comprising one or more memory units; and processing apparatus comprising one or more processing units, wherein the memory stores code arranged to run on the processing apparatus, the code being configured so as when run on the processing apparatus, the processing apparatus performs a method performed in a system comprising a first party and a second party, the method comprising:

generating, by computer equipment of the first party, a template data structure of a first blockchain transaction having an input field based on an output field from a prior blockchain transaction associated with the second party;

generating, by computer equipment of the first party, a message by applying a digital cryptographic signature scheme to the template of the first blockchain transaction;

generating, by computer equipment of the first party, a cryptographic secret by applying a cryptographic hash function to the message;

generating, by computer equipment of the first party, a cryptographic value the cryptographic secret, wherein the cryptographic secret cannot be derived from the cryptographic value;

generating, by computer equipment of the first party, a first puzzle blockchain transaction comprising, as part of a first locking script, a knowledge proof configured to, when executed by a script engine of a blockchain node, cause the blockchain node to verify that an unlocking script of a second blockchain transaction comprises the cryptographic secret;

sending, by computer equipment of the first party, the first puzzle blockchain transaction to a blockchain node of a first blockchain network to cause the first puzzle blockchain transaction to be published on a first blockchain;

obtaining, by computer equipment of the second party, the cryptographic value the cryptographic secret;

applying, by computer equipment of the second party, a digital cryptographic signature scheme to the cryptographic value to create a digital cryptographic signature;

sending, by computer equipment of the second party, the digital cryptographic signature to the first party;

including, by computer equipment of the first party, the digital cryptographic signature in the unlocking script of the template of the first blockchain transaction and then sending the first blockchain transaction to a blockchain node of a second blockchain network to cause the first blockchain transaction to be published on a second blockchain;

determining, by computer equipment of the second party, the message and the cryptographic secret from the first blockchain transaction published on the second blockchain; and creating, by computer equipment of the second party, the second blockchain transaction which, when executed by a script engine of a blockchain node, causes the blockchain node to verify that the unlocking script of the second blockchain transaction comprises the cryptographic secret, thereby unlocking a first output of the first puzzle blockchain transaction, and submitting the second blockchain transaction to the first blockchain.

15. A computer program embodied on non-transitory computer-readable storage media and configured as, when run on one or more processors, the one or more processors perform a method performed in a system comprising a first party and a second party, the method comprising:

generating, by computer equipment of the first party, a template data structure of a first blockchain transaction having an input field based on an output field from a prior blockchain transaction associated with the second party;

generating, by computer equipment of the first party, a message by applying a digital cryptographic signature scheme to the template of the first blockchain transaction;

generating, by computer equipment of the first party, a cryptographic secret by applying a cryptographic hash function to the message;

generating, by computer equipment of the first party, a cryptographic value the cryptographic secret, wherein the cryptographic secret cannot be derived from the cryptographic value;

generating, by computer equipment of the first party, a first puzzle blockchain transaction comprising, as part of a first locking script, a knowledge proof configured to, when executed by a script engine of a blockchain node, cause the blockchain node to verify that an unlocking script of a second blockchain transaction comprises the cryptographic secret;

sending, by computer equipment of the first party, the first puzzle blockchain transaction to a blockchain node of a first blockchain network to cause the first puzzle blockchain transaction to be published on a first blockchain;

obtaining, by computer equipment of the second party, the cryptographic value the cryptographic secret;

applying, by computer equipment of the second party, a digital cryptographic signature scheme to the cryptographic value to create a digital cryptographic signature;

sending, by computer equipment of the second party, the digital cryptographic signature to the first party;

including, by computer equipment of the first party, the digital cryptographic signature in the unlocking script of the template of the first blockchain transaction and then sending the first blockchain transaction to a blockchain node of a second blockchain network to cause the first blockchain transaction to be published on a second blockchain;

determining, by computer equipment of the second party, the message and the cryptographic secret from the first blockchain transaction published on the second blockchain; and creating, by computer equipment of the second party, the second blockchain transaction which, when executed by a script engine of a blockchain node, causes the blockchain node to verify that the unlocking script of the second blockchain transaction comprises the cryptographic secret, thereby unlocking a first output of the first puzzle blockchain transaction, and submitting the second blockchain transaction to the first blockchain.

* * * * *